United States Patent
Syrjarinne et al.

(10) Patent No.: US 9,609,582 B2
(45) Date of Patent: Mar. 28, 2017

(54) HANDLING PACKET DATA UNITS

(71) Applicant: Nokia Technologies Oy, Espoo (FI)

(72) Inventors: Jari Tapani Syrjarinne, Tampere (FI); Juha Salokannel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/648,235

(22) PCT Filed: Dec. 7, 2012

(86) PCT No.: PCT/IB2012/057066
§ 371 (c)(1),
(2) Date: May 28, 2015

(87) PCT Pub. No.: WO2014/087196
PCT Pub. Date: Jun. 12, 2014

(65) Prior Publication Data
US 2015/0304941 A1    Oct. 22, 2015

(51) Int. Cl.
*H04W 64/00* (2009.01)
*H04W 48/16* (2009.01)
*H04W 4/02* (2009.01)
*G01S 1/04* (2006.01)
*H04W 8/00* (2009.01)
*H04W 4/00* (2009.01)
(Continued)

(52) U.S. Cl.
CPC .............. *H04W 48/16* (2013.01); *G01S 1/04* (2013.01); *H04L 67/18* (2013.01); *H04W 4/008* (2013.01); *H04W 4/02* (2013.01); *H04W 4/021* (2013.01); *H04W 4/025* (2013.01); *H04W 8/005* (2013.01); *H04W 64/00* (2013.01); *H04W 84/20* (2013.01)

(58) Field of Classification Search
CPC ..................................................... H04W 24/00
USPC ........................... 455/41.1, 41.2, 41.3, 456.1
See application file for complete search history.

(56) References Cited

U.S. PATENT DOCUMENTS

| 7,656,822 B1 * | 2/2010 | AbdelAziz .......... H04L 12/4633 370/255 |
| 2010/0302102 A1 * | 12/2010 | Desai ........................ G01S 3/50 342/417 |
| 2011/0072479 A1 | 3/2011 | Hsu et al. |

(Continued)

FOREIGN PATENT DOCUMENTS

| EP | 1280030 | 1/2003 |
| EP | 2211195 | 7/2010 |
| EP | 2509343 | 10/2012 |
| WO | 2007099196 | 9/2007 |

OTHER PUBLICATIONS

International Search Report and Written Opinion received for corresponding Patent Cooperation Treaty Application No. PCT/IB2012/057066 , dated Sep. 24, 2013, 15 pages.

(Continued)

*Primary Examiner* — Wen Huang
(74) *Attorney, Agent, or Firm* — Locke Lord LLP (57) ABSTRACT

Apparatus is configured to provide a first packet data unit for transmission as part of a first Bluetooth low energy advertising packet, the first packet data unit including a first indicator indicating the use of a first coordinate frame and first data indicating a location, the first data indicating the location using the first coordinate frame, and to cause transmission of the first Bluetooth low energy advertising packet including the first packet data unit.

12 Claims, 6 Drawing Sheets

(51) Int. Cl.
*H04L 29/08* (2006.01)
*H04W 84/20* (2009.01)

(56) References Cited

U.S. PATENT DOCUMENTS

| | | | | |
|---|---|---|---|---|
| 2012/0178471 A1* | 7/2012 | Kainulainen | ......... | G01S 5/0009 |
| | | | | 455/456.1 |
| 2012/0258669 A1* | 10/2012 | Honkanen | ................. | G01S 3/46 |
| | | | | 455/67.11 |
| 2013/0065584 A1* | 3/2013 | Lyon | ..................... | H04W 28/06 |
| | | | | 455/434 |
| 2014/0066091 A1* | 3/2014 | Varoglu | ................. | G01S 19/10 |
| | | | | 455/456.1 |

OTHER PUBLICATIONS

"IEEE Standard for Local and Metropolitan Area Networks:Overview and Architecture", IEEE Standard 802-2001, Mar. 8, 2002, pp. 1-48.
"Bluetooth Specification V4.0", Specification of the Bluetooth system, Jun. 30, 2010, 2302 pages.
Extended European Search Report received for corresponding European Patent Application No. 12889425.0, dated Mar. 16, 2016, 5 pages.
EP Communication for European Patent Application No. 12889425.0 dated Nov. 7, 2016, 3 pages.

* cited by examiner

HANDLING PACKET DATA UNITS

RELATED APPLICATION

This application was originally filed as PCT Application No. PCT/IB2012/057066 filed Dec. 7, 2012.

FIELD

The present application relates to handling packet data units.

BACKGROUND

Bluetooth Low Energy (BLE) is a new wireless communication technology published by the Bluetooth SIG as a component of Bluetooth Core Specification Version 4.0. BLE is a lower power, lower complexity, and lower cost wireless communication protocol, designed for applications requiring lower data rates and shorter duty cycles. Inheriting the protocol stack and star topology of classical Bluetooth, BLE redefines the physical layer specification, and involves many new features such as a very-low power idle mode, a simple device discovery, and short data packets, etc.

BLE technology is aimed at devices requiring a low power consumption, for example devices that may operate with one or more button cell batteries such as sensors, key fobs, and/or the like. BLE can also be incorporated into devices such as mobile phones, smart phones, tablet computers, laptop computers, desktop computers etc.

SUMMARY

Various aspects of examples of the invention are set out in the claims.

A first aspect of the invention provides apparatus configured:
to provide a first packet data unit for transmission as part of a first Bluetooth low energy advertising packet, the first packet data unit including:
  a first indicator indicating the use of a first coordinate frame; and
  first data indicating a location, the first data indicating the location using the first coordinate frame; and
to cause transmission of the first Bluetooth low energy advertising packet including the first packet data unit.

The apparatus may be configured to transmit the first Bluetooth low energy advertising packet.

The location may be the location of the apparatus.

The apparatus may be configured to provide the first packet data unit by creating it.

The first indicator may consist of one or two bits of data.
The first indicator may consist of one bit of data.
The first coordinate frame may be a global coordinate frame, for instance WGS-84.
The first coordinate frame may be a local coordinate frame, for instance East-North.
The apparatus may be configured:
to provide a second packet data unit for transmission as part of a second Bluetooth low energy advertising packet, the second packet data unit including:
  a second indicator indicating the use of a second coordinate frame, wherein the first coordinate frame is different to the second coordinate frame; and
  second data indicating the location, the second data indicating the location using the second coordinate frame; and
to cause successive transmission of the first and second Bluetooth low energy advertising packets including the first and second packet data units respectively.

The apparatus may be configured to cause successive transmission of the first and second Bluetooth low energy advertising packets in a repeated sequence.

The apparatus may be configured to transmit the first and second Bluetooth low energy advertising packets.

The apparatus may be configured to provide the first and second packet data units by creating them.

The first and second indicators may each consist of one or two bits of data.

The first and second indicators may each consist of one bit of data.

The second coordinate frame may be a global coordinate frame, for instance WGS-84.

The second coordinate frame may be a local coordinate frame, for instance East-North.

The second data may indicate the location using the second coordinate frame in two dimensions only.

A second aspect of the invention provides apparatus configured:
in response to receiving a packet data unit as part of a Bluetooth low energy advertising packet, the packet data unit including an indicator indicating the use of a first coordinate frame, determining whether the coordinate frame is a coordinate frame that is usable by the apparatus;
on determining that the coordinate frame is usable by the apparatus, using data indicating a location, the data indicating a location forming part of the received packet data unit and indicating the location using the first coordinate frame, to calculate a location of the apparatus; and
on determining that the coordinate frame is not usable by the apparatus, discarding the packet data unit without using the packet data unit to calculate the location of the apparatus.

A third aspect of the invention provides a non-transitory computer-readable storage medium having stored thereon computer-readable code, which, when executed by computing apparatus, causes the computing apparatus to perform a method comprising:
providing a first packet data unit for transmission as part of a first Bluetooth low energy advertising packet, the first packet data unit including:
  a first indicator indicating the use of a first coordinate frame; and
  first data indicating a location, the first data indicating the location using the first coordinate frame; and
causing transmission of the first Bluetooth low energy advertising packet including the first packet data unit.

The computer-readable code when executed may cause the computing apparatus to transmit the first Bluetooth low energy advertising packet.

The location may be the location of the apparatus.

The computer-readable code when executed may cause the computing apparatus to provide the first packet data unit by creating it.

The first indicator may consist of one or two bits of data.
The first indicator may consist of one bit of data.
The first coordinate frame may be a global coordinate frame, for instance WGS-84.
The first coordinate frame may be a local coordinate frame, for instance East-North.
The computer-readable code when executed may cause the computing apparatus to:

provide a second packet data unit for transmission as part of a second Bluetooth low energy advertising packet, the second packet data unit including:
  a second indicator indicating the use of a second coordinate frame, wherein the first coordinate frame is different to the second coordinate frame; and
  second data indicating the location, the second data indicating the location using the second coordinate frame; and
cause successive transmission of the first and second Bluetooth low energy advertising packets including the first and second packet data units respectively.

The computer-readable code when executed may cause the computing apparatus to cause successive transmission of the first and second Bluetooth low energy advertising packets in a repeated sequence.

The computer-readable code when executed may cause the computing apparatus to transmit the first and second Bluetooth low energy advertising packets.

The computer-readable code when executed may cause the computing apparatus to provide the first and second packet data units by creating them.

The first and second indicators may each consist of one or two bits of data.

The first and second indicators may each consist of one bit of data.

The second coordinate frame may be a global coordinate frame, for instance WGS-84.

The second coordinate frame may be a local coordinate frame, for instance East-North.

The second data may indicate the location using the second coordinate frame in two dimensions only.

A fourth aspect of the invention provides a non-transitory computer-readable storage medium having stored thereon computer-readable code, which, when executed by computing apparatus, causes the computing apparatus to perform a method comprising:
  in response to receiving a packet data unit as part of a Bluetooth low energy advertising packet, the packet data unit including an indicator indicating the use of a first coordinate frame, determining whether the coordinate frame is a coordinate frame that is usable by the apparatus;
  on determining that the coordinate frame is usable by the apparatus, using data indicating a location, the data indicating a location forming part of the received packet data unit and indicating the location using the first coordinate frame, to calculate a location of the apparatus; and
  on determining that the coordinate frame is not usable by the apparatus, discarding the packet data unit without using the packet data unit to calculate the location of the apparatus.

A fifth aspect of the invention provides a method comprising:
  providing a first packet data unit for transmission as part of a first Bluetooth low energy advertising packet, the first packet data unit including:
    a first indicator indicating the use of a first coordinate frame; and
    first data indicating a location, the first data indicating the location using the first coordinate frame; and
  causing transmission of the first Bluetooth low energy advertising packet including the first packet data unit.

The method may further comprise transmitting the first Bluetooth low energy advertising packet.

The location may be the location of the apparatus.

The first packet data unit may be provided by creating it.

The first indicator may consist of one or two bits of data.

The first indicator may consist of one bit of data.

The first coordinate frame may be a global coordinate frame, for instance WGS-84.

The first coordinate frame may be a local coordinate frame, for instance East-North.

The method may further comprise:
  providing a second packet data unit for transmission as part of a second Bluetooth low energy advertising packet, the second packet data unit including:
    a second indicator indicating the use of a second coordinate frame, wherein the first coordinate frame is different to the second coordinate frame; and
    second data indicating the location, the second data indicating the location using the second coordinate frame; and
  causing successive transmission of the first and second Bluetooth low energy advertising packets including the first and second packet data units respectively.

The first and second Bluetooth low energy advertising packets may be successively transmitted in a repeated sequence.

The method may further comprise transmitting the first and second Bluetooth low energy advertising packets.

The first and second packet data units may be provided by creating them.

The first and second indicators may each consist of one or two bits of data.

The first and second indicators may each consist of one bit of data.

The second coordinate frame may be a global coordinate frame, for instance WGS-84.

The second coordinate frame may be a local coordinate frame, for instance East-North.

The second data may indicate the location using the second coordinate frame in two dimensions only.

A sixth aspect of the invention provides a method comprising:
  in response to receiving a packet data unit as part of a Bluetooth low energy advertising packet, the packet data unit including an indicator indicating the use of a first coordinate frame, determining whether the coordinate frame is a coordinate frame that is usable by the apparatus;
  on determining that the coordinate frame is usable by the apparatus, using data indicating a location, the data indicating a location forming part of the received packet data unit and indicating the location using the first coordinate frame, to calculate a location of the apparatus; and
  on determining that the coordinate frame is not usable by the apparatus, discarding the packet data unit without using the packet data unit to calculate the location of the apparatus.

A seventh aspect of the invention provides a computer program comprising instructions that when executed by a computer apparatus control it to perform any of the methods heretofore described.

An eighth aspect of the invention provides apparatus, the apparatus having at least one processor and at least one memory having computer-readable code stored thereon which when executed controls the at least one processor to:
  provide a first packet data unit for transmission as part of a first Bluetooth low energy advertising packet, the first packet data unit including:

a first indicator indicating the use of a first coordinate frame; and first data indicating a location, the first data indicating the location using the first coordinate frame; and cause transmission of the first Bluetooth low energy advertising packet including the first packet data unit.

The computer-readable code when executed may control the at least one processor to transmit the first Bluetooth low energy advertising packet.

The location may be the location of the apparatus.

The computer-readable code when executed may control the at least one processor to provide the first packet data unit by creating it.

The first indicator may consist of one or two bits of data.

The first indicator may consist of one bit of data.

The first coordinate frame may be a global coordinate frame, for instance WGS-84.

The first coordinate frame may be a local coordinate frame, for instance East-North.

The computer-readable code when executed may control the at least one processor to:

provide a second packet data unit for transmission as part of a second Bluetooth low energy advertising packet, the second packet data unit including:

a second indicator indicating the use of a second coordinate frame, wherein the first coordinate frame is different to the second coordinate frame; and second data indicating the location, the second data indicating the location using the second coordinate frame; and cause successive transmission of the first and second Bluetooth low energy advertising packets including the first and second packet data units respectively.

The computer-readable code when executed may control the at least one processor to cause successive transmission of the first and second Bluetooth low energy advertising packets in a repeated sequence.

The computer-readable code when executed may control the at least one processor to transmit the first and second Bluetooth low energy advertising packets.

The computer-readable code when executed may control the at least one processor to provide the first and second packet data units by creating them.

The first and second indicators may each consist of one or two bits of data.

The first and second indicators may each consist of one bit of data.

The second coordinate frame may be a global coordinate frame, for instance WGS-84.

The second coordinate frame may be a local coordinate frame, for instance East-North.

The second data may indicate the location using the second coordinate frame in two dimensions only.

A ninth aspect of the invention provides apparatus, the apparatus having at least one processor and at least one memory having computer-readable code stored thereon which when executed controls the at least one processor to implement the steps of:

in response to receiving a packet data unit as part of a Bluetooth low energy advertising packet, the packet data unit including an indicator indicating the use of a first coordinate frame, determining whether the coordinate frame is a coordinate frame that is usable by the apparatus;

on determining that the coordinate frame is usable by the apparatus, using data indicating a location, the data indicating a location forming part of the received packet data unit and indicating the location using the first coordinate frame, to calculate a location of the apparatus; and on determining that the coordinate frame is not usable by the apparatus, discarding the packet data unit without using the packet data unit to calculate the location of the apparatus.

Bluetooth Low Energy or BLE as used herein denotes Bluetooth Core Specification Version 4.0 or later versions that are backwards-compatible with Version 4.0. A BLE device or component is a device or component that is compatible with Bluetooth Core Specification Version 4.0.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF VARIOUS EMBODIMENTS

The following acronyms are used in the specification and have the meanings referred to:

BLE: Bluetooth Low Energy
BT: Bluetooth
BT SIG: Bluetooth Special Interest Group
LE: Low Energy
RFU: Reserved for Future Use BLE technology has been proposed to be used in high accuracy indoor positioning (HAIP) systems. HAIP with BLE uses an array of phased antennas to calculate angle-of-departure or angle-of-arrival of a signal. The principles behind calculating the angle-of-departure or angle-of-arrival are described in the prior art.

There are two main options for positioning a mobile device or beacon in a BLE HAIP system.

In a first option, the mobiles/tags transmit a BLE positioning packet, which is received at a base station (which can be called a locator) including an antenna array. The base station (or some other device) measures the angle-of-arrival (both azimuth and elevation angles) of the signal using samples of the positioning packet received at different elements of the antenna array, and consequently calculates the position of the mobile/tag. This can be called network-centric positioning. The network-centric approach is limited by capacity.

In a second option, a base station includes an antenna array and transmits a BLE positioning packet from different elements of the antenna array in a way that allows the mobile/tag to calculate the angle-of-departure (both azimuth and elevation angles) of the signal from the base station. The base station here can be termed a beacon. This can be termed mobile-centric positioning. The mobile-centric case is advantageous from the capacity point of view as any number of devices can measure and use broadcast signals for positioning purposes.

A base station or beacon may be able to operate according to both options.

It is the mobile-centric option that is of primary interest in the following, although of course a dual-mode beacon operates in the mobile-centric mode as well as the network-centric mode.

Figure 1:
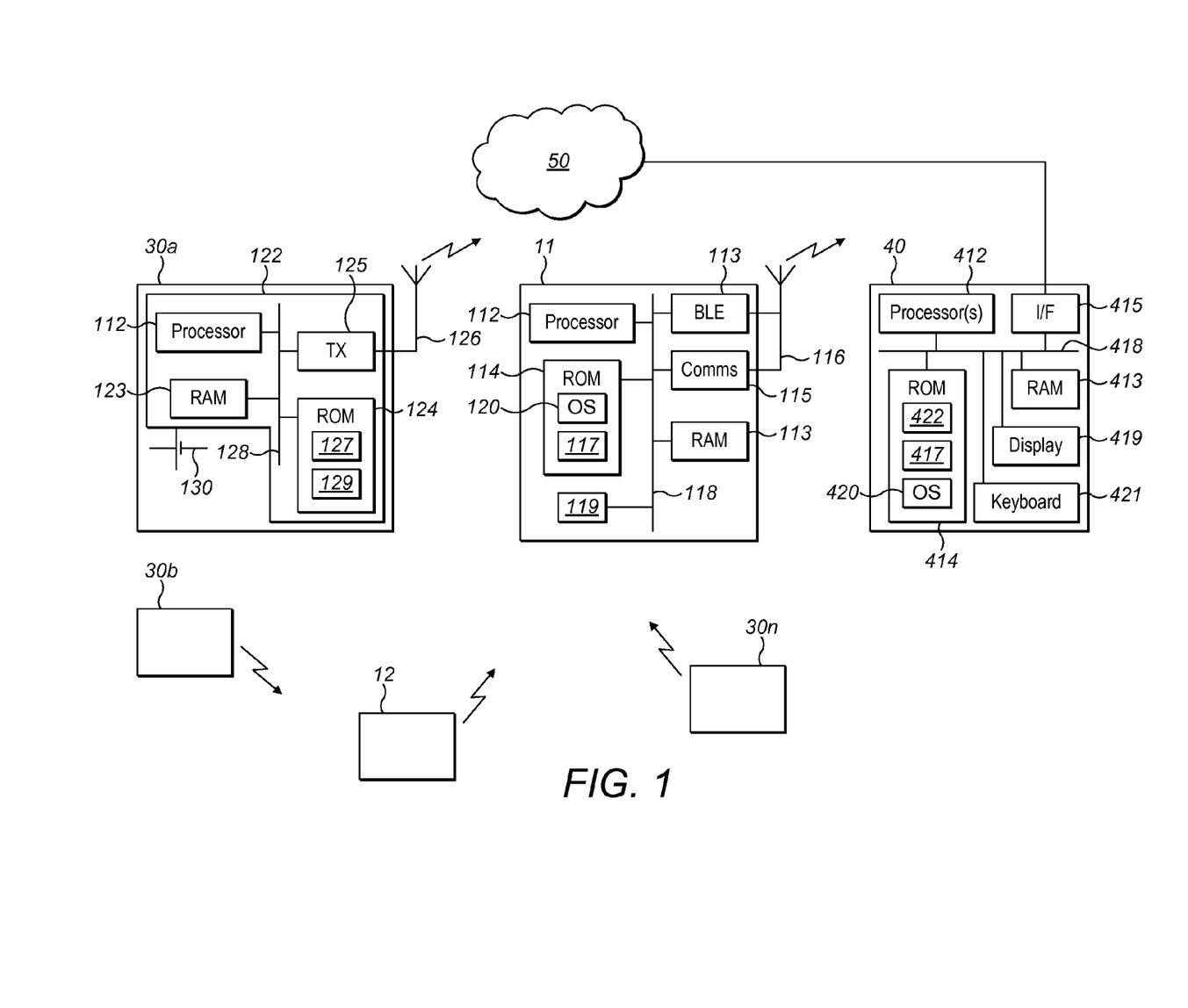
FIG. 1 is a schematic diagram of a system according to aspects of the invention including components according to aspects of the invention and operating according to aspects of the invention.

FIG. 1 shows a system according to embodiments of the invention. The system 10 includes a first device 11 and a second device 12. It also includes first to nth BLE beacons 30a, 30b to 30n, each of which may be referred to as a beacon 30. The system also includes a server 40. The first and second devices 11, 12 are mobile or portable and their locations can be tracked.

Briefly, the BLE beacons 30 are based at different locations within a building or complex of buildings and periodically transmit two different messages. These messages are, firstly, AoD positioning packets and, secondly, positioning advertisement messages. Both the AoD positioning messages and the positioning advertisement messages transmitted by a given beacon 30 include an identifier that is unique to that beacon 30 within the building.

Each of the BLE beacons 30 includes multiple antenna elements and transmits the AoD positioning packets including a certain packet tail called AoD extension. The beacon has multiple antenna elements which are used sequentially during the transmission of the AoD extension. The sequence of antenna elements involves switching between them in a pre-defined order. Each of the first and second devices 11, 12 is able to receive an AoD positioning packet from the BLE beacons 30 and calculate, from parameters of the received signal at the part corresponding to the AoD extension, a bearing from the beacon 30 at which the AoD positioning packet was received at the device 11, 12. The bearing is able to be calculated because of the form given to the signal transmitted along the bearing by the multiple antenna elements.

The positioning advertisement messages include information designating the location and orientation of the beacon 30. They may be sent from only a single element of the antenna 116. The positioning advertisement messages are received at the devices 11, 12.

Both AoD positioning packets and positioning advertisement messages are transmitted periodically, although the AoD positioning packets are transmitted more frequently.

The devices 11, 12 then can calculate their position using information designating the location and orientation of the beacon and the calculated bearing. Devices 11, 12 can calculate their locations having received an AoD positioning packet from one beacon with a reasonable degree of accuracy. Devices 11, 12 can calculate their locations with greater accuracy by triangulating information relating to AoD positioning packets received from two or more beacons, although the accuracy achieved using only one beacon typically is sufficient. Devices 11, 12 are able to calculate their location without network assistance.

The first device 11 includes a BLE module 13, which operates according to the BLE standard. Each of the BLE beacons 30 also includes a BLE module that operates according to the BLE standard.

The first device 11 includes a processor 112. The processor 112 is connected to volatile memory such as RAM 113 by a bus 118. The bus 118 also connects the processor 112 and the RAM 113 to non-volatile memory, such as ROM 114. A communications interface or module 115 is coupled to the bus 118, and thus also to the processor 112 and the memories 113, 114. A BLE module 13 is coupled to the bus 118, and thus also to the processor 112 and the memories 113, 114. An antenna 116 is coupled to the communications module 115 and the BLE module 13, although each may instead have its own antenna. Within the ROM 114 is stored a software application 117. The software application 117 in these embodiments is a navigation application, although it may take some other form. An operating system (OS) 120 also is stored in the ROM 114.

The first device 11 may take any suitable form. Generally speaking, the first device 11 may comprise processing circuitry 112, including one or more processors, and a storage device 114, 113, comprising a single memory unit or a plurality of memory units. The storage device 114, 113 may store computer program instructions that, when loaded into the processing circuitry 112, control the operation of the first device 11.

The BLE module 13 may take any suitable form. Generally speaking, the BLE module 13 of the first device 11 may comprise processing circuitry, including one or more processors, and a storage device comprising a single memory unit or a plurality of memory units. The storage device may store computer program instructions that, when loaded into the processing circuitry, control the operation of the BLE module 13.

The first device 11 also comprises a number of components which are indicated together at 119. These components 119 may include any suitable combination of a display, a user input interface, other communication interfaces (e.g. wifi, etc.), a speaker, a microphone, and a camera. The components 119 may be arranged in any suitable way.

The BLE module 13 includes a communication stack that is implemented at least partly in software using processor and memory resources (not shown), all of which are included within the BLE module 13. The BLE module 13 is configured, when enabled by the navigation application 117, to calculate the location of the host device 11 as described above, and to report the location to the navigation application 117.

The navigation application 117 is configured to control the BLE module 13 to switch between a positioning mode in which it calculates the position of the host device 11, 12 and a non-positioning mode in which it does not calculate the position of the host device 11, 12, as required by the navigation application 117.

The navigation application 117 may for instance control the BLE module to reside in the positioning mode when positioning has been enabled by the user or by the operating system 120 and when outdoor positioning (e.g. GPS) is unavailable, and to reside in the non-positioning mode otherwise. Alternatively, the navigation application 117 may for instance control the BLE module to reside in the positioning mode when positioning has been enabled by the user or by the operating system 120 and when BLE positioning advertisement messages have been received within a certain time period (e.g. 10 minutes before the current time), and to reside in the non-positioning mode otherwise.

The second device 12 may be configured and operate in the same way as the first device 11.

The devices 11, 12 may be mobile phones, smart phones, tablet computers, laptop computers, cameras, mp3-players, equipment integrated within vehicles, etc. The devices 11, 12 may be based around any suitable operating system, for instance the Symbian operating system or Microsoft Windows operating system, although any other operating system may instead be used. The devices 11, 12 may run different operating systems.

The beacon 30, for instance the first beacon 31*a*, includes a BLE module 121, an antenna 126 and a source of power 130. In the BLE module 121 of the beacon 30, a processor 122, RAM 123, ROM 124, a transmitter 125, software 127 and a bus 128 are constituted and connected in any suitable way. The ROM 124 of the beacon 30 also stores information 129. The information 129 includes an identifier that identifies the beacon, the location of the beacon, and the orientation of the beacon.

The beacon 30 includes a communication interface 108, using which communications can be received from the server 40. The server 40 may be connected either directly or indirectly with the beacon 30. The server 40 may be connected with the beacon 30 by Ethernet.

The source of power 130 may be for instance a power-over-Ethernet source, a battery, or mains power. The source of power 130 powers the BLE module 121 and any other components of the beacon 30.

The BLE module 121 of the beacon 30 may solely be a transmitter 125 and may not perform receiver functions. The transmitter 125 may include hardware needed for receiving, the receive function being disabled through the software 127. Alternatively, the transmitter 125 may be absent of some of the hardware needed for receiving. Put another way, it may be a transmitter or it may be a transceiver in which the receive functions have been disabled in software.

Each of the BLE beacons 30 includes multiple antenna elements (indicated together at 126 in the Figure) and transmits AoD positioning messages using these multiple antenna elements simultaneously. By transmitting the AoD positioning messages in this way, a device 11, 12 can calculate from parameters of the received signal that included the AoD positioning message an angle (actually, both azimuth and elevation angles) from the beacon 30 at which the device 11, 12 is located.

Each of the BLE beacons 30 also is configured to transmit information designating the location and orientation of the beacon 30. This information forms part of the positioning advertisement messages. As such, devices 11, 12 can calculate their locations having received an AoD positioning packet from one beacon 30 with a reasonable degree of accuracy. Devices 11, 12 can calculate their locations with greater accuracy by triangulating or by combining location information relating to AoD positioning message received from two or more beacons, although the accuracy achieved using only one beacon typically is sufficient. Devices 11, 12 are able to calculate their location without network assistance. Additionally, the beacons 30 do not need to receive communications from the devices 11, 12 in order to allow the devices 11, 12 to calculate their positions from the received AoD positioning message.

Positioning advertisement messages may be transmitted by each beacon 30 periodically, for instance at 1 Hz (1 second intervals) or 2 Hz (0.5 second intervals). or at intervals defined by some component within the system. They may alternatively be transmitted on request of some component within the system.

AoD positioning messages may be transmitted by each beacon 30 periodically, for instance at 20 Hz (so millisecond intervals). Clearly, devices 11, 12 can calculate their positions at the same periodicity, or the devices 11, 12 can filter multiple measurements for better accuracy. Such a frequency of transmission of AoD positioning messages allows rapid and reliable positioning updates for the devices 11, 12.

The beacon 30 may take any suitable form. Generally speaking, the beacon 30 may comprise processing circuitry, including one or more processors, and a storage device, comprising a single memory unit or a plurality of memory units. The storage device may store computer program instructions that, when loaded into the processing circuitry, control the operation of the beacon 30.

The other beacons 30*b* . . . 30*n* may be configured and operate in the same way as the first beacon 30*a*. The other beacons are different to the first beacon 30*a* at least in that the information 129 stored in the ROM 124 includes a different identifier and a different location, and may also include a different orientation of the beacon.

The server 40 includes a processor 412. The processor 412 is connected to volatile memory such as RAM 413 by a bus 418. The bus 418 also connects the processor 112 and the RAM 413 to non-volatile memory, such as ROM 414. A communications interface 415 is coupled to the bus 418, and thus also to the processor 412 and the memories 413, 414. The interface 415 is connected to the radio network 50 in any suitable way, for instance via the Internet or a local network. Within the ROM 414 is stored a software application 417. An operating system (OS) 420 also is stored in the ROM 414. Within the ROM 414 is also stored a location database 422.

An output device such as a display 419 may be provided with the server 40. An input device such as a keyboard 421 may be provided with the server 40.

The server 40 may take any suitable form. Generally speaking, the server 40 may comprise processing circuitry 412, including one or more processors, and a storage device 414, 413, comprising a single memory unit or a plurality of memory units. The storage device 414, 413 may store computer program instructions that, when loaded into the processing circuitry 412, control the operation of the server 40.

Some further details of components and features and alternatives for them will now be described.

The computer program instructions 117 may provide the logic and routines that enables the first device 11 to perform the functionality described below. The computer program instructions 117 may be pre-programmed into the first device 11. Alternatively, they may arrive at the first device 11 via an electromagnetic carrier signal or be copied from a physical entity such as a computer program product, a non-volatile electronic memory device (e.g. flash memory) or a record medium such as a CD-ROM or DVD. They may for instance be downloaded to the first device 11 from a server, for instance the server 40 but possibly another server such as a server of an application marketplace or store.

The processing circuitry 112, 122, 412 may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry or processor 112, 122, 412 may be termed processing means.

Typically, the BLE modules 13, 121 each comprise a processor coupled connected to both volatile memory and non-volatile memory. The computer program is stored in the non-volatile memory and is executed by the processor using the volatile memory for temporary storage of data or data and instructions.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Each BLE module 13, 121 may be a single integrated circuits. Each may alternatively be provided as a set of integrated circuits (i.e. a chipset). The BLE modules 13, 121 may alternatively be hardwired, application-specific integrated circuits (ASIC).

The communication interface 115 may be configured to allow two-way communication with external devices and/or networks. The communication interface may be configured to communicate wirelessly via one or more of several protocols such as Global System for Mobile Communications (GSM), Code Division Multiple Access (CDMA), Universal Mobile Telecommunications System (UMTS) and IEEE 802.11 (Wi-Fi). Alternatively or additionally, the communication interface 115 may be configured for wired communication with a device or network.

The apparatus 11, 12, 40, 30 may comprise further optional software components which are not described in this specification since they may not have direct interaction with the features described.

The BLE beacons 30 are distributed around a building or premises. For instance a first beacon 30a may be located in a canteen, a second beacon 30b may be located in a reception area, and so on. The first and second beacons 30a and 30b can be referred to as beacons 30. Beacons 30 do not need to provide complete coverage of a building, but advantageously are provided to provide good coverage of all key locations within the building.

The beacon identifier transmitted by a beacon 30 may be provided in a Device Address field or in a Device Identifier field of an advertising message, according to the BLE specification, or it may take some other form.

The latest version of the BLE specification defines three advertising channels, which serve for device discovery and other broadcasting purpose. To identify BLE devices, two important identifies—Device Address and Device Name—are highly relied upon. According to the BLE specification, packets sent in the advertising channels (index=37, 38 and 39) shall contain the device addresses, which are used to identify a BLE device. The identifier relating to a beacon may be a device address included in the Device Address field, or it may be included in a payload of the advertising message.

There are two types of device addresses: public device address and random device address, each of them is 48 bits in length. A device shall contain at least one type of device address and may contain both.

Public Device Address

The content of a public device address contains two fields:
company_assigned field is in the 24 least significant bits
company_id field is in the 24 most significant bits The public device address shall be created in accordance with section 90.2 ("48-bit universal LAN MAC addresses") of the IEEE 802-2001 standard (http://standards.ieee.org/getieee802/download/802-2001.pdf) and using a valid Organizationally Unique Identifier (OUI) obtained from the IEEE Registration Authority (see http://standards.ieee.org/regauth/oui/forms/ and sections 9 and 9.1 of the IEEE 802-2001 specification).

Random Device Address

A random device address is divided into the following two fields:
hash field is in the 24 least significant bits
random field is in the 24 most significant bits The detailed specification of the hash field and random field can be found in BT Specification v4.0, Vol. 3, Part C, Section 10.8.2.3 and Section 10.8.2.2, respectively.

On the other hand, the Generic Access Profile (GAP) also provides a Local Name AD Type to contain the device name in the BLE advertising data (BT Specification v4.0, Vol. 3, Part C, Section 11.1.2).

Figure 2A:
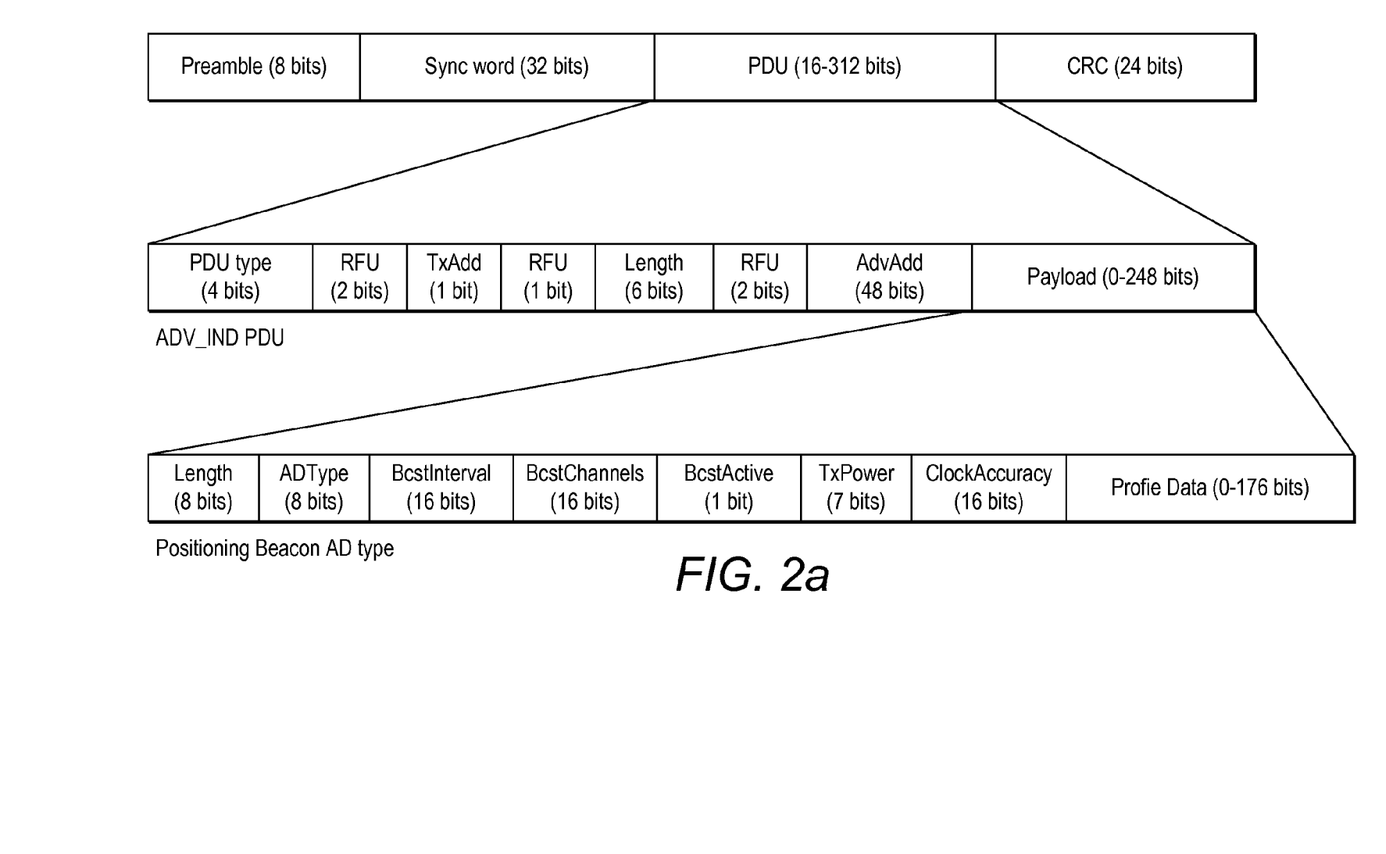
FIGS. 2A and 2B present the format of an Advertising Channel PDU used in embodiments of the invention.
Figure 2B:
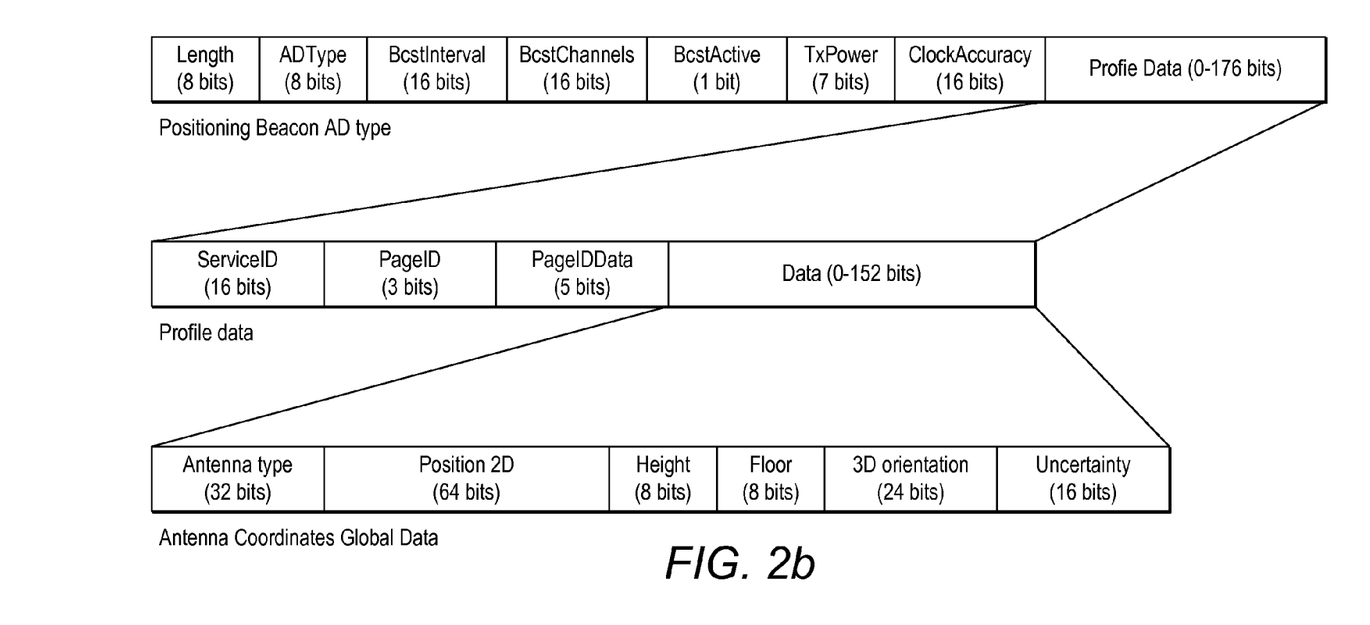

A positioning advertisement message may be a BLE link layer packet, an example of which is shown in FIG. 2. FIG. 2A shows higher level components of the positioning advertisement messages, and FIG. 2B shows some lower level components of the positioning advertisement messages.

As shown in FIG. 2, there are four main components to the message. The first part is a preamble. The second part is a sync word. The third part is a packet data unit (PDU). The fourth part is a cyclic redundancy check (CRC).

Here, the preamble is one octet (eight data bits, also known as one byte). The sync word is four octets. The PDU is between two and 39 octets. The CRC is three octets.

As shown in FIG. 2A, the PDU includes two main sections. The first is the header, and the second is the payload. The header here has 64 bits (six octets). The payload has a length that is between zero and 31 octets, as per the length field in the header part of the PDU.

The header is shown in FIG. 2A as being divided into six fields. The PDU type field comprises four bits, and identifies the type of the PDU. The second field is reserved for future use (RFU) and includes two bits. A TxAdd field is one bit. The fourth field is reserved for future use (RFU) and includes one bit. The Length field includes six bits. The sixth field is reserved for future use (RFU) and includes two bits. An AdvA field (or AdvAdd field) is 6 octets (48 bits).

The TxAdd field indicates whether the address of the beacon 30 in the AdvA field is public or random. The AdvA field includes the public or random address of the beacon 30.

The payload of the PDU, hereafter termed the Positioning Beacon AD Type, includes eight fields. The first of these is a length field, of one octet. The second is an AdType field which is one octet. The AdType field indicates type. A BcstInterval field is two octets long. This indicates the interval between successive Broadcasts. A BcstChannels field is two octets long. This indicates the channels that are used for broadcast. A BcstActive field is one bit long. This bit indicates whether broadcasting is active. A TransmitPower field is seven bits long. The transmit power is indicated in this field. A ClockAccuracy field is sixteen bits long. This includes data that indicates the accuracy of the clock within the beacon 30. Lastly, a Profile Data field is between 0 and 22 octets long, according to the value included in the Length field.

The Positioning Beacon AD Type is shown both FIGS. 2A and 2B, but this is the same in both Figures. FIG. 2B shows in detail the Profile Data field of the Positioning Beacon AD Type.

The Profile Data field of the Positioning Beacon AD Type includes four fields. The first is ServiceID, which is two octets in length. The data included in the ServiceID field is used only by the Host of the BT communications stack. An identifier of the service that is provided by the positioning messages is included in this field. A PageID field is three bits. A PageIDData field is five bits long. Lastly, a Data field is between 0 and 19 octets, according to the data included in the Length field of the Positioning Beacon AD Type.

The Data field constitutes an Antenna Coordinates Global Data part, which is shown at the bottom of FIG. 2B. This includes six fields. The first field is Antenna type, and is four octets in length. The second field is 2D position, and is 8 octets in length. The third field is Height, and is one octet. The fourth field is floor, and is one octet. A fifth field is a 3D orientation field, of three octets. The last field is an Uncertainty field of two octets.

In the Antenna type field is included data that indicates the type of antenna of the beacon 30. This includes an indication of the particular arrangement of antenna elements in the antenna 126. The 2D position field indicates the position of the beacon in two dimensions. The Height field includes data indicating the location of the beacon in the third, height dimension. The Floor field includes data which indicates which floor the beacon is located. The 3D orientation field includes data which indicates the orientation of the beacon 30 in three dimensions. The Uncertainty field includes data that indicates the level of uncertainty of the 2d position data.

When using a BLE advertising channel for communicating from the beacon 30 to a device 11, 12, only 39 octets are available for the advertising PDU that is the payload of the positioning advertising messages. This constitutes a significant limitation on the amount of information that can be carried. By constructing the advertising PDU well, real performance advantages can be achieved in a BLE HAIP system. However the PDU positioning advertising message is constructed, though, there may not be sufficient bandwidth to transmit all the information that is desired to be transmitted.

For instance, in a mobile-centric HAIP system, only eight octets (64 bits) may be available for communicating the location of the beacon 30. This could mean that only one coordinate frame may be supported.

In these embodiments, support for multiple location coordinate frames is provided by providing an advertising PDU with an indicator indicating the use of a particular coordinate frame and data indicating a location, the data indicating the location using the specified coordinate frame.

Figure 3:
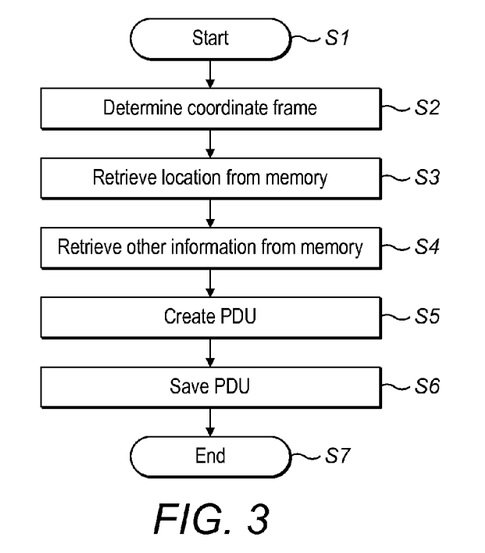
FIG. 3 is a flow chart illustrating operation of a beacon forming part of FIG. 1 and operating according to embodiments of the invention.

FIG. 3 is a flowchart illustrating creation of a PDU by the beacon 30.

Operation begins at step S1. At step S2, the coordinate frame for the PDU is determined. The coordinate frame to use in the PDU may be determined by the beacon 30 in any suitable way. For instance, it may be determined based on control messages received from the server 40. Alternatively, it may determined based on request messages received from devices 11, 12. Alternatively, it may be determined based on a setting that is stored within a memory (e.g. ROM 214) of the beacon 30.

The coordinate frame may be a global coordinate frame, which relates the location of the beacon 30 according to a global reference. An example of a global coordinate frame is WGS-84. This is the coordinate frame that is used by GPS.

It is particularly advantageous for a global coordinate frame to be WGS-84 because this simplifies operation of devices 11, 12 and roaming between HAIP systems and outdoor positioning systems such as GPS-based systems. In the global coordinate frame, the different dimensions may be latitude and longitude. Alternatively, the coordinate frame may be a local coordinate frame. An example of a local coordinate frame is East-North-Up.

At step S3, the location of the beacon 30 is retrieved from a memory, for instance the ROM 124. The location retrieved is indicated using the coordinate frame that was determined in step S2. For a two-dimensional location, this can be shortened to East-North. A local coordinate frame such as East-North defines the location of the beacon with respect to an origin, which may be chosen arbitrarily. East-North coordinates may be given in units of meters. A local coordinate frame is particularly advantageous in used cases and deployments that are based solely on beacons 30, such as is the case with HAIP systems for large warehouses, storage depots, office complexes, etc.

At step S4 other information is retrieved from a memory, for instance the ROM 129, of the beacon 30. This other information is the other information that is needed to form the PDU of the positioning advertisement message, as is described above with reference to FIG. 2.

At step S5 the PDU is created. The created PDU has the form described above with reference to FIG. 2. Here, the Position 2D field of the Antenna Coordinates Global Data is provided with an indicator indicating the coordinate frame used in the PDU and also data indicating the location of the beacon 30, the data indicating the location using the coordinate frame that is identified by the indicator.

Figure 4A:
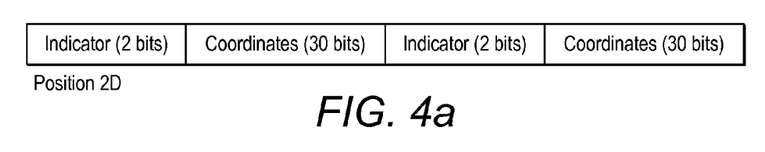
FIGS. 4a and 4b illustrate parts of a PDU created and transmitted by the beacon forming part of FIG. 1 and operating according to embodiments of the invention.
Figure 4B:
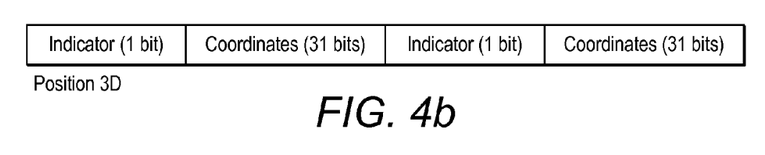

Alternative forms for the Position 2D field are shown in FIGS. 4A and 4B. In FIG. 4A, an Indicator field of 2 bits is followed by Coordinate field of 30 bits. The Indicator field includes data that indicates the coordinate frame that is used in the Coordinates field. The Coordinates field is provided with the location in one dimension (for instance latitude or East). Because the Coordinates field has 30 bits, the location of the beacon in the one dimension can be specified with very high resolution.

The Position 2D field is divided into two halves, the first half including the Indicator field and the Coordinates field already discussed. The second half includes another Indicator field of 2 bits and another Coordinates field of 30 bits. The Coordinates field of the second half of the Position 2D field includes the location of the beacon 30 in a dimension that is different to the dimension indicated in the other coordinates field. For instance, the dimension is the North direction (as opposed to the East direction) or longitude (as opposed to latitude). The Indicator field in the second half of the Position 2D field indicates the coordinate frame that is used to denote the location in the Coordinates field.

The use of two bits for the Indicator field allows the information included in the Indicator field to take any of four values. This allows up to four coordinate frames to be supported. One of the possible values for the two bits in the indicator field may designate the coordinate frame being WGS-84. Another value may indicate the East-North(-Up) coordinate frame. The other two possible values may be reserved for future use, or may be allocated to other coordinate frames (or one may be reserved and one may be allocated to another coordinate frame).

The inclusion of two indicators fields in the Position 2D field allows a different coordinate frame in to be used for the coordinate field in the first half of the Position 2D field than is used in the coordinate field of the second half of the Position 2D field.

Alternatively, the second Indicator field may be omitted, in which case the Coordinates fields may be expanded from 30 bits to 31 bits each. This further increases the resolution of the location information included in the Position 2D field.

An alternative is shown in FIG. 4B. Here, the Indicator fields are only one bit long, and the Coordinates field are 31 bits each. As such, the maximum number of coordinate frames that can be supported is two. For instance, the supported coordinate frames may be WGS-84 and East-North(-Up). As with the fields shown in FIG. 4A, the inclusion of two Indicator fields means that different coordinate fields may be used for the location information included in the different Coordinates fields. Also, the second Indicator field may be omitted, thereby freeing one additional bit for providing an increased resolution to the location information in one of the dimensions.

Referring back to FIG. 3, after the PDU has been created at step S5, the PDU is saved at step S6. The operation ends at step S7.

Figure 5:
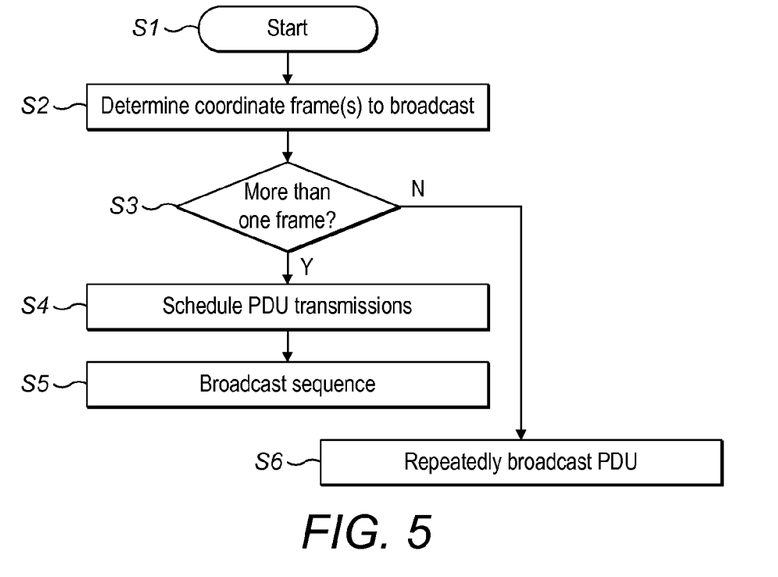
FIG. 5 is a flow chart illustrating operation of a beacon forming part of FIG. 1 and operating according to embodiments of the invention.

Operation of the beacon 30 in transmitting positioning advertisement messages will now be described with reference to FIG. 5. The operation begins at step S1. At step S2, the beacon 30 determines the coordinate frame or frames that are to be broadcast. This may occur in any suitable way. For instance, it may be based on messages received from the server 40. Alternatively, it may be based on messages that are received from devices 11, 12. Alternatively, it may be based on settings that are preprogrammed into beacon 30, through data stored in the ROM 214 for instance. Step S2 produces an identification of one or more coordinate frames in which location information is to be broadcast.

Figure 6A:
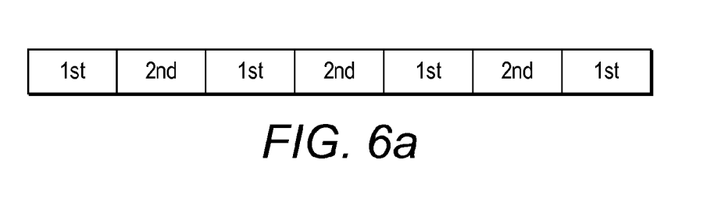
FIGS. 6a, 6b and 6c illustrate sequences of PDUs created and transmitted by the beacon forming part of FIG. 1 and operating according to embodiments of the invention.
Figure 6B:
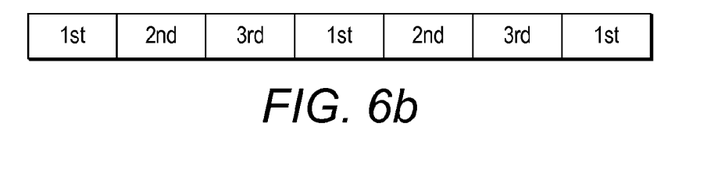

At step S3, the beacon 30 determines whether more than one coordinate frame was determined at step S2. On a positive determination, i.e. on determining that two or more coordinate frames are to be broadcast, PDU transmissions are scheduled at step S4. Step S4 involves creating a schedule whereby PDUs relating to different coordinate frames are transmitted in a sequence, which is repeated. For instance, where there are two different coordinate frames, the sequence is transmitting the first, then the second, then the first again, then the second again, etc. This is shown in FIG. 6A.

Where there are three different coordinate frames, the sequence comprises PDUs with the first coordinate frame then the second then the third, then repeating. This is shown in FIG. 6B.

As step S5, the sequence of PDUs is broadcast. Each PDU is broadcast as part of a respective positioning advertisement message.

On a negative determination from step S3, at step S6 PDUs with the single coordinate frame are broadcast repeatedly. Each PDU is broadcast as part of a respective positioning advertisement message. This is illustrated in FIG. 6C.

The broadcast of PDUs in step S5 or step S6 involves periodic transmission. As such, the time between successive PDU broadcasts is the same. For instance, successive PDUs may be broadcast at a one second separation, equating to 1 Hz.

Figure 6C:
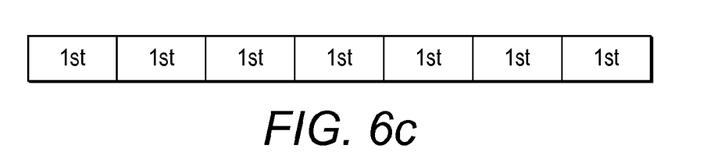

As such, where there is only one coordinate frame, as shown in FIG. 6C, PDUs including the location of the beacon 30 are transmitted with the location in the first coordinate frame are transmitted more frequently than they are where there are multiple coordinate frames, as shown in FIGS. 6A and 6B.

Figure 7:
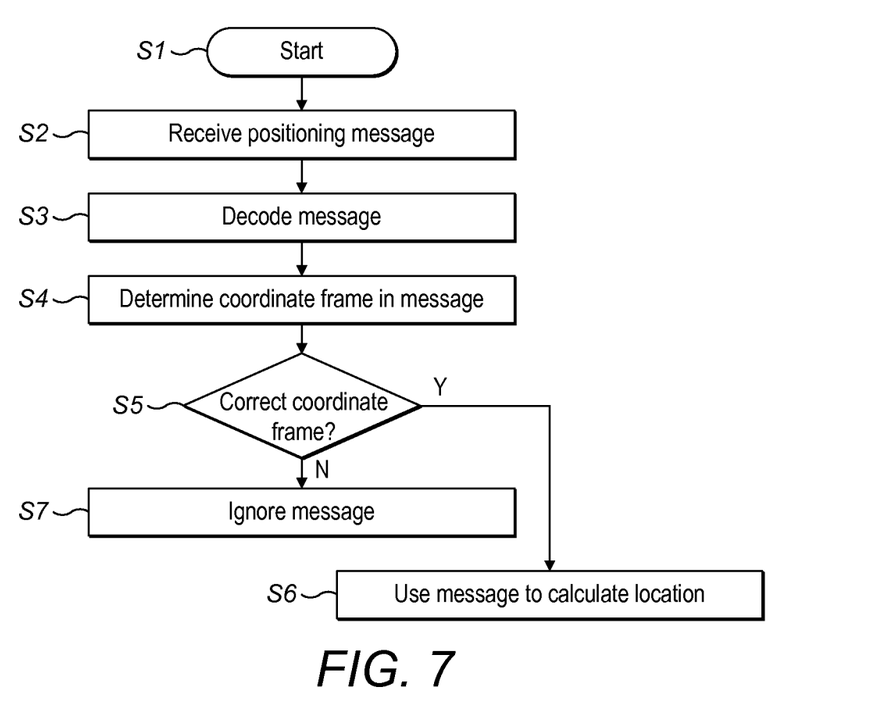
FIG. 7 is a flow chart illustrating operation of a mobile device forming part of FIG. 1 and operating according to embodiments of the invention.

Operation of a mobile device 11, 12 will now be described with reference to FIG. 7.

The operation starts at step S1. At step S2, the device n receives a positioning advertisement message. At step S3, the positioning advertisement message is decoded.

At step S4, the mobile device n determines the coordinate frame in the positioning advertisement message. This involves identifying the Indicator bits (in the case of 2 bits being used as shown in FIG. 4A) or the Indicator bit (in the case of 1 bit being used are shown in FIG. 4B) in the Position 2D field in the Data field of the Profile Data, as shown in FIG. 2B.

At step S5, the mobile device n determines whether the coordinate frame determined at step S4 is the one that is correct for the mobile device 11. This can occur in any suitable way. For instance, it may involve comparing a coordinate frame specified by the navigation application 117 with the coordinate frame that is determined to be included in the positioning advertisement message, and determining whether there is a match. If the device n supports multiple coordinate frame types, then step S5 will produce a positive result if the coordinate frame determined in step S4 matches any of the correct coordinate frame types.

On a positive determination from step S5, the positioning advertisement message is used to process received AoD positioning messages to calculate the location of the mobile device 11.

On a negative determination from step S5, the positioning advertisement message received at step S2 and decoded as step S3 is ignored at step S7. Ignoring the message at step S7 may involve deleting the message without using contents of the message to position the mobile device 11.

The beacon 30 may be configured with coordinate frame and/or location data for broadcast in any suitable way.

For instance, the beacon 30 may be configured with coordinate frame and/or location data by the server 40, for instance through an Ethernet connection.

It may alternatively be configured to create PDUs with coordinate frame and/or location data provided by an operator connected to the beacon 30 through a portable device, such as a tablet computer or some other portable device 11. Access may be through a secured wireless connection. Access may be dependent on operator authentication, for instance by requiring a password. Configuration may occur through the device 11 being provided with a configuration software application or through a web interface, for instance.

A number of alternatives will be apparent to the skilled person, and one alternative will now be described.

Although it is described above that the beacon 30 creates the PDUs that form part of the positioning advertisement messages, this step may be performed instead by the server 40. In this case, the PDUs are created by the server 40 and sent to the beacon 30, from where they are incorporated in positioning advertisement messages and broadcast. The server 40 thus causes the beacon 30 to transmit the PDUs. Here, the beacons 30 do not need to store information concerning their location orientation etc. other than by storing the PDU received from the server 40. However, the location of the beacon 30 does need to be known by the server 40.

Numerous advantages of the above-described embodiments will be apparent. Advantages include providing support for multiple coordinate frames, allowing the system to accommodate a broader range of mobile devices 11, 12. Moreover, this can be achieved without any increase in bandwidth requirements.

These advantages can be achieved with a relatively small increase in the complexity of the implementation of the beacon 30. Also, the average time between a mobile device 11, 12 being switched on and being able to first obtain a fixed location may be increased, due to the potential increase in the average time to receiving a PDU that includes a location of the originating beacon 30 using a coordinate frame that is suitable for use by the mobile device 11,12. The maximum delay to the time for obtaining the first fix can be calculated as being approximately equal to the number of supported coordinate frame types multiplied by the interval between successive positioning advertisement message transmissions.

It will be appreciated that the above-described embodiments are not limiting on the scope of the invention, which is defined by the appended claims and their alternatives. Various alternative implementations will be envisaged by the skilled person, and all such alternatives are intended to be within the scope of the claims. A number of alternatives will now be described.

Although in the above the AoD positioning packets and the positioning advertisement messages are separate, they may instead be combined. For instance, an AoD tail can be added to a positioning advertisement message, allowing a mobile device 11, 12 to determine its position after having received only one message from a beacon. However, the inclusion of the AoD tail limits the number of bits available for communicating the other information needed by the mobile devices 11, 12.

Although in the above the positioning advertisement messages are transmitted on BLE advertising channels, it will be appreciated that the information communicated to the mobile devices 11, 12 in the positioning advertisement messages need not be communicated in this way. For instance, the positioning advertisement messages may be broadcast on one or more BLE data channels.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

A computer-readable medium may comprise a computer-readable storage medium that may be any tangible media or means that can contain or store the instructions for use by or in connection with an instruction execution system, apparatus, or device, such as a computer as defined previously.

According to various embodiments of the previous aspect of the present invention, the computer program according to any of the above aspects, may be implemented in a computer program product comprising a tangible computer-readable medium bearing computer program code embodied therein which can be used with the processor for the implementation of the functions described above.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

The invention claimed is:

1. Apparatus, the apparatus comprising at least one processor and at least one memory having computer-readable code stored thereon which when executed controls the at least one processor to:

provide a first packet data unit for transmission as part of a first Bluetooth low energy advertising packet, the first packet data unit including:

a first indicator indicating the use of a first coordinate frame of a plurality of coordinate frames supported by the apparatus; and first data indicating an indoor location, the first data indicating the indoor location using the first coordinate frame; and cause transmission of the first Bluetooth low energy advertising packet including the first packet data unit, wherein the first coordinate frame is a) a global coordinate frame, or b) a local coordinate frame, wherein the apparatus is configured to:

support at least both the global coordinate frame and the local coordinate frame for indicating indoor location by data in packet data units of Bluetooth low energy advertising packets, and wherein the computer-readable code when executed further controls the at least one processor to:

determine which of at least both the global coordinate frame and the local coordinate frame supported by the apparatus is to be used to indicate the indoor location by the data in the packet data units of the Bluetooth low energy advertising packets.

2. Apparatus as claimed in claim 1, wherein the indoor location is the indoor location of the apparatus.

3. Apparatus as claimed in claim 1, wherein the computer-readable code when executed controls the at least one processor to:

provide a second packet data unit for transmission as part of a second Bluetooth low energy advertising packet, the second packet data unit including:

a second indicator indicating the use of a second coordinate frame, wherein the first coordinate frame is different to the second coordinate frame; and second data indicating the indoor location, the second data indicating the indoor location using the second coordinate frame; and cause successive transmission of the first and second Bluetooth low energy advertising packets including the first and second packet data units respectively.

4. Apparatus as claimed in claim 3, wherein the second data indicates the indoor location using the second coordinate frame in two dimensions only.

5. Apparatus as claimed in claim 1,
wherein the computer-readable code when executed further controls the at least one processor to:
determine at least two of at least both the global coordinate frame and the local coordinate frame supported by the apparatus that are to be used to indicate the indoor location by the data in the packet data units of the Bluetooth low energy advertising packets.

6. Apparatus, the apparatus comprising at least one processor and at least one memory having computer-readable code stored thereon which when executed controls the at least one processor to perform:
in response to receiving a packet data unit as part of a Bluetooth low energy advertising packet, the packet data unit including an indicator indicating the use of a first coordinate frame of a plurality of coordinate frames supported by a beacon that transmitted the packet data unit as part of the Bluetooth low energy advertising packet, determining whether the coordinate frame is a coordinate frame that is usable by the apparatus;
on determining that the coordinate frame is usable by the apparatus, using data indicating a location, the data indicating a location forming part of the received packet data unit and indicating the location using the first coordinate frame, to calculate an indoor location of the apparatus; and
on determining that the coordinate frame is not usable by the apparatus, discarding the packet data unit without using the packet data unit to calculate the indoor location of the apparatus.

7. A method, comprising:
providing, by an apparatus, a first packet data unit for transmission as part of a first Bluetooth low energy advertising packet, the first packet data unit including:
a first indicator indicating the use of a first coordinate frame of a plurality of coordinate frames supported by the apparatus; and
first data indicating an indoor location, the first data indicating the indoor location using the first coordinate frame; and causing transmission of the first Bluetooth low energy advertising packet including the first packet data unit, wherein the first coordinate frame is,
a) a global coordinate frame,
or
b) local coordinate frame,
wherein the apparatus is configured to:
support at least both the global coordinate frame and the local coordinate frame for indicating indoor location by data in packet data units of Bluetooth low energy advertising packets, and
wherein the method further comprises:
determining which of at least both the global coordinate frame and the local coordinate frame supported by the apparatus is to be used to indicate the indoor location by the data in the packet data units of the Bluetooth low energy advertising packets.

8. The method of claim 7, wherein the indoor location is the indoor location of the apparatus.

9. The method of claim 7, further comprising:
providing a second packet data unit for transmission as part of a second Bluetooth low energy advertising packet, the second packet data unit including:
a second indicator indicating the use of a second coordinate frame, wherein the first coordinate frame is different to the second coordinate frame; and
second data indicating the indoor location, the second data indicating the indoor location using the second coordinate frame; and
causing successive transmission of the first and second Bluetooth low energy advertising packets including the first and second packet data units respectively, wherein the second coordinate frame is,
a global coordinate frame,
or
b) local coordinate frame.

10. The method of claim 9, wherein the first and second Bluetooth low energy advertising packets are successively transmitted in a repeated sequence.

11. The method of claim 9, wherein the second data indicates the indoor location using the second coordinate frame in two dimensions only.

12. The method of claim 7, further comprising:
determining at least two of at least both the global coordinate frame and the local coordinate frame supported by the apparatus that are to be used to indicate the indoor location by the data in the packet data units of the Bluetooth low energy advertising packets.

* * * * *